(12) United States Patent
Sanger

(10) Patent No.: US 7,656,567 B2
(45) Date of Patent: Feb. 2, 2010

(54) SELECTING A BEST THREE COLOR SOLUTION TO A CIE LAB INPUT USING LINEAR INTERPOLATION

(75) Inventor: Kurt M. Sanger, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 646 days.

(21) Appl. No.: 11/035,306

(22) Filed: Jan. 13, 2005

(65) Prior Publication Data

US 2006/0152745 A1 Jul. 13, 2006

(51) Int. Cl.
*G03F 3/08* (2006.01)
(52) U.S. Cl. .................. 358/518; 358/1.9; 358/504; 382/167; 345/593; 345/600; 345/604
(58) Field of Classification Search ............ 358/518, 358/3.23, 504, 525; 345/153, 591, 593–595, 345/600–602; 382/162, 167
See application file for complete search history.

(56) References Cited

U.S. PATENT DOCUMENTS

| | | | |
|---|---|---|---|
| 4,275,413 A | | 6/1981 | Sakamoto et al. |
| 5,087,126 A | * | 2/1992 | Pochieh ...................... 358/518 |
| 5,528,386 A | | 6/1996 | Rolleston et al. |
| 5,745,120 A | * | 4/1998 | De Baer et al. ............. 345/590 |
| 5,793,501 A | * | 8/1998 | Murakami .................. 358/518 |
| 5,870,530 A | | 2/1999 | Balasubramanian |
| 5,892,891 A | | 4/1999 | Datal et al. |
| 6,313,823 B1 | * | 11/2001 | Cappels et al. .............. 345/589 |
| 6,335,734 B1 | * | 1/2002 | Nagae et al. ................ 345/589 |
| 6,362,808 B1 | * | 3/2002 | Edge et al. ................... 382/162 |
| 6,381,036 B1 | * | 4/2002 | Olson ......................... 358/1.9 |
| 6,386,670 B1 | * | 5/2002 | Huang et al. ................ 358/522 |
| 6,421,142 B1 | * | 7/2002 | Lin et al. ..................... 358/1.9 |
| 6,809,837 B1 | * | 10/2004 | Mestha et al. ................ 358/1.9 |
| 6,833,937 B1 | * | 12/2004 | Cholewo .................... 358/518 |
| 2005/0249408 A1 | * | 11/2005 | Haikin ....................... 358/518 |

FOREIGN PATENT DOCUMENTS

EP 592141 A2 * 4/1994
EP 1100256 A1 * 5/2001

OTHER PUBLICATIONS

K. D. Gennetten, "RGB to CMYK conversion using 3D barycentric interpolation", Proc. SPIE 1909, (1993), pp. 116-126.*
Victor Ostromoukhov, "Chromaticity gamut enhancement by heptatone multicolor printing", Proc. SPIE 1909, (1993), pp. 139-151.*
"Applied Regression Analysis", third edition, edited by N. Draper and H. Smith; 1998.
N. Draper and H. Smith; Regression in Matrix Terms: Straight Line Case; from Applied Regression Analysis, Third Edition, 1998.

* cited by examiner

*Primary Examiner*—Mark K Zimmerman
*Assistant Examiner*—Javier J Ramos
(74) *Attorney, Agent, or Firm*—Nelson A. Blish

(57) ABSTRACT

A method for selecting a best three color solution for a CIE_Lab request comprises generating a three color database (10) of CIE_Lab values at specified colorant input levels. A closest point in the database with colorant input levels is found, which will produce a CIE_Lab value that is closest to the CIE_Lab request. A matrix of points centered on the closest point (30) is selected. A linear model to the matrix of points is found. An output color consisting of a set of colorant levels is created using the linear model.

23 Claims, 9 Drawing Sheets

SELECTING A BEST THREE COLOR SOLUTION TO A CIE LAB INPUT USING LINEAR INTERPOLATION

FIELD OF THE INVENTION

The present invention relates in general to digital printing wherein a color is created by combining percentages of multiple primary colorants and in particular to printing multiple color recipes and a method to rate each recipe to select the best.

BACKGROUND OF THE INVENTION

Digital halftone color proofers use cyan, magenta, yellow, and black (CMYK) colorants to image halftone bitmap separations and render halftone proofs. An example of such a proofer is the Kodak Approval Digital Color Proofing System. This system allows recipe colors to be generated using different amounts of each of the primary colors. This system also has specialty donors such as orange, green, blue, white, and metallic, which may each be used as a component of a recipe color. For such a system customers need a method to convert a color request, in terms of a color coordinate system such as Commission Internationale de l'Éclairage L*a*b* (CIE_Lab), into a recipe.

The digital proofing system may have different versions of colorants. For instance there may be more than one type of cyan, magenta, yellow, and black, to emulate different ink sets. When new donor sets become available customers need to easily convert recipes from one donor set to another. Customers may have a recipe in a primary donor set such as CMYK, and may desire to add a special color such as orange to perform a closer color match to the color request. It is also desirable to determine how closely a recipe will match the desired color request and which recipe is likely to perform a better match.

Customers may have a recipe using a specific donor color, and may have a need to convert the recipe to a different set of primary colors if the special donor is not available. For example, if one were imaging a blue recipe with a special blue, and were able to create the same color using cyan, magenta, and black, then they might be able to print the image using the CMK recipe when blue was not available. In a machine such as Kodak Approval this might happen if all of the blue donor was expended, or if the blue donor was not loaded into the machine at the time that the image was being printed.

Other color printing systems, paint mixing systems, and ink blending, have the same problem in determining how to render a requested color from numerous available primary colorants. In some of those systems there is a desire to reduce the number of primary colorants used in the output solution. Or there is a need to be able to render the requested color using different primary colorants. Plus there is a desire to know, prior to producing the requested color, how accurate the generated recipe is expected to be.

U.S. Pat. No. 5,087,126 (Pochieh) discloses a method for estimating a color, which includes interpolating between measured points to create additional triangular points to be used. Pochieh does not estimate points that are outside the measured space. Instead he teaches to move the requested color inside the space. Pochieh's method reduces the number of points that must be stored, and is capable of running at high speed.

U.S. Pat. No. 5,870,530 (Balasubramanian) discloses a method of selecting an extra colorant based on a nonlinear function in reflectance. Balasubramanian teaches how to convert a cyan, magenta, and yellow (CMY), input to cyan, magenta, yellow, orange, green, and blue (CMYOGB), with an increase in the OGB levels out such that the increased color saturation of the secondary colors is utilized to increase the saturation in the output image. Balasubramanian teaches how to expand the output color gamut, but does not teach how to faithfully reproduce a requested color.

U.S. Pat. No. 4,275,413 (Sakamoto et al.) discloses estimating color by performing linear interpolation on a tetrahedral collection of data points that surround the requested color. This method uses the minimum amount of data points to estimate the color resulting in the least amount of work.

U.S. Pat. No. 5,528,386 (Rolleston et al.) discloses a method to produce a linear color output in cyan, magenta, yellow, and black, (CMYK), from an input signal consisting of red, green, and blue, (RGB). Rolleston et al. teaches a method of determining how much black to use to perform under color removal, along with an adjustment of the remaining CMY components to produce the desired color.

U.S. Pat. No. 5,892,891 (Datal et al.) discloses a system that uses four colorants to obtain any desired color. Datal et al. teaches comparing the requested color to a primary donor set consisting of CMY to an extended donor set to determine if the requested color is out of the CMY color gamut. Datal et al. does not teach to divide the CMY color space into pages consisting of three color combinations with black and Datal et al. does not teach how to add black to the CMY set. Datal et al. teaches that the primary color set must contain three colors substantially situated about the origin of the color space, and comparing this color gamut to the gamut of a color set that contains the extended color. Datal et al. discloses creating an output data set by eliminating the color opposite to the extended color. Eliminating the opposite color was already being used in the graphic arts when screening high-fi color where the cyan screen angle was used for orange, and the magenta screen angle was being used for green.

Existing algorithms to convert a color specified using red, green, and blue (RGB) components into a cyan, magenta, and yellow (CMY) usually perform a tri-linear approximation based on the three closest points. Using the minimum of three points increases the speed of the calculation allowing it to be accomplished in-line while the CMY colorants are being printed. Lookup tables are used to return the three CMY points given an RGB input.

In converting from RGB to CMYK one needs to select how to determine the black level. One must also select a method for estimating the black level when converting from a colorant independent space such as CIE_Lab. Converting from a first CMYK colorant to a second CMYK colorant has a similar problem. Two popular methods for selecting the black level are under color removal (CCR), and gray component replacement (GCR). GCR is equivalent to selecting the maximum amount of black. Additional methods such as U.S. Pat. No. 5,528,386 may select the minimum amount of black. None of these methods teach to eliminate one of the CMYK output colorants.

SUMMARY OF THE INVENTION

It is an advantage of the present invention to reduce the number of primary colorants used because each colorant in the output color requires additional material, additional time to load, additional time to image, and additional time to unload the colorant. Reducing the output colors to three components eliminates the problem of how to estimate the black level as its one of the three possible color components.

The present invention discloses how to select the best three colorants to reproduce the desired color. This includes testing color combinations of CMK, CYK, MYK, MOK, YOK, YGK, CGK, CBK, and MBK. In addition other combinations such as CMB may be tested. The present invention will rate each solution by how far off the page the desired color is, the accuracy of the model used, and the accuracy of the reproduction system.

It is an advantage of the present invention how accurate the color estimate is predicted. This allows selection of a method that is the best solution. It also allows determination if additional data points are needed, or finer resolution, to obtain a better estimate. A further advantage is that different solutions are rated and provide multiple choices for how the requested color is obtained.

It is an advantage of the present invention that solutions using different primary colorants are presented and rated. This allows selection of a solution using primary colorants that are in stock. Or a primary, colorant is chosen that had not previously been considered in order to perform a closer match to the requested color.

The invention and its objects and advantages will become more apparent in the detailed description of the preferred embodiment presented below.

DETAILED DESCRIPTION OF THE INVENTION

Figure 1:
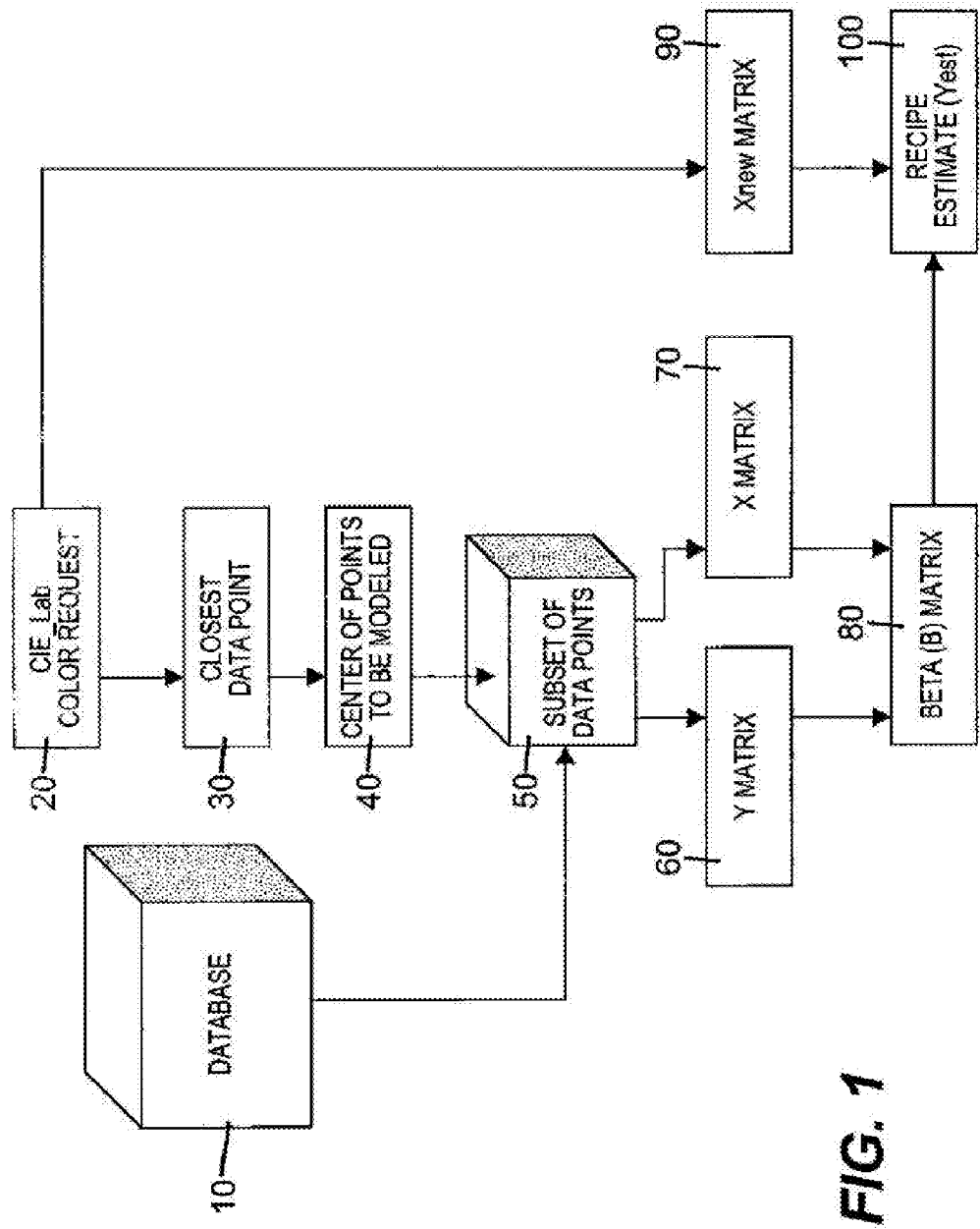
FIG. 1 is a block diagram showing calculation of the recipe estimate for one three color database.

To use the present invention a database 10, shown in FIG. 1, is created of output color as a function of specified colorant input levels. Color patches composed of combinations of different amounts of different colorants is printed. The color patches are measured with an instrument capable of recording CIE_Lab with a D50 Illuminant and 2 degree observer. Such an instrument is a Gretagmacbeth Spectroscan/Spectrolino. A Kodak Approval Digital Color Proofing System to image Cyan DC02, Magenta DM02, and Black DK02 donors is used. Nine cyan density clicks from D-49 in steps of 10, nine magenta density clicks from D-52 in steps of 10, and black density clicks of {−61, −52, −42, −32, −20, −8, 6, and 30} were used. On the Kodak Approval Digital Color Proofing System a Cyan DC02 density click is converted to Status T Density by the formula Density Click*0.025+1.17+Cyan Density of Paper. Magenta DM02 Status T Density is equal to the Density Click*0.025+1.25+Magenta Density of Paper. Black DK02 Status T Density is equal to Density Click*0.025+1.46+Visual Density of Paper. Each color patch was measured with the Gretagmacbeth Spectrolino recording the CIE_Lab values. The data is placed in a comma separated values file with each line consisting of one entry. Each line also contains the density click settings for the three color components. The data is organized by black, then cyan, then magenta with magenta changing the fastest and black changing the slowest.

The method of the present invention requires the user to enter a color request 20 in terms of CIE_Lab where CIE_L* is the luminance, CIE_a* is the magenta/green level, and CIE_b* is the yellow/cyan component. The difference is computed between the color request and each entry in the database using the square root of the sum of the squares of {CIE_L*(request)−CIE_L*(entry), CIE_a*(request)−CIE_a*(entry), CIE_b*(request)−CIE_b*(entry)}. This difference is the Delta E difference between two CIE_Lab color measurements. The method continues by finding the coordinates of the closest data point 30 in the database 10.

In actual practice additional time is saved by computing DeltaE$^2$ instead of DeltaE. This eliminates the step of computing a square root for each data point tested. Then the closest point as the point with the minimum DeltaE$^2$ is found.

Once the coordinates of the closest point 30 are found these coordinates are used as the center of the data points about the color request. If the closest point is on the edge of the database, then adjust the center of data points to use points just inside the surface by testing the coordinates against the indexes. Given each colorant, the maximum number of indexes used is found. If the coordinate of the closest point is equal to the first index for this color, then set the coordinate of the center to the second index. Else if the coordinate for the closest point is equal to the last index for this color, then set the coordinate of the center to the last index minus one. These steps are repeated for each color in the data set to obtain the center of the points to be modeled 40.

In an example of the present invention, eight black levels are shown. If the black index for the closest point is 1, then the black index for the center of points to be modeled is set to 2. If the black index for the closest point was 8, then the black index for the center of points to be modeled to is set to 7. Otherwise the black index for the closest point is set to the black index for the center of points to be modeled.

Next, a subset of data points 50 centered about the center points to be modeled 40 by looking up the coordinates of each point in the initial database is created. Each entry consists of CIE_Lab values and colorant input levels. In the present invention the database consists of three colorants, the subset consists of 27 data points, composing a 3×3×3 matrix of points centered about the center of points to be modeled 40.

Next, a Y matrix 60 of colorant settings from the subset of data points 50 is created. The model will generate output colorant settings corresponding to input CIE_Lab values. The Y matrix 60 will have one column of 27 black settings, one column of 27 cyan settings, and one column of 27 magenta settings making it a 27-row by 3-column matrix.

Next, an X matrix 70 of measured color from the subset of data points 50 is created. The X matrix 70 contains one column for each factor used in the model. For example, the model will show the output colorant settings as a function of CIE_L*, CIE_a*, and CIE_b*. In this description the present invention will also add columns to the X matrix for CIE_L*$^2$, CIE_a*$^2$, CIE_b*$^2$, CIE_L*×CIE_a*, CIE_a*×CIE_b*, CIE_b*×CIE_L*, and a column of ones. This creates an X matrix 70 that is 27 rows by 10 columns. Each row corresponds to an entry for one of the 27 rows of the subset of data points centered about the points to be modeled 40. The modeling process will create slopes for each factor. The modeling process is a general linear model and it is well known in the art. A good reference is in "Applied Regression Analysis", third edition, edited by Norman R. Draper and Harry Smith, 1998.

Next, the Beta matrix (B) 80, wherein B=(X' inv(X)) X' Y where X is the X matrix, X' is the transpose of the X matrix, inv(X) is the inverse of the X matrix, and Y is the Y matrix. The B matrix 80 will be 10-rows by 3-columns is computed.

The Beta matrix (B) may be used to estimate a Y estimate (Yest) 100 by multiplying a new X (Xnew) 90 by Beta matrix 80. (Yest=Xnew B) where X new is a 1 by 10 matrix composed of {CIE_L*new, CIE_a*new, CIE_b*new, CIE_L*new$^2$, CIE_a*new$^2$, CIE_b*new$^2$, CIE_L*new×CIE_a*new, CIE_a*new×CIE_b*new, CIE_b*new×CIE_L*new, and 1}. Yest will be a 1 by 3 matrix consisting of {colorant 1 setting, colorant 2 setting, and colorant 3 setting}. For example, the Yest will consist of {black density click, cyan density click, and magenta density click}.

To estimate the colorant levels to obtain an output color for the color request 20 an X request matrix (Xnew) 90 is composed using Xnew={CIE_L*request, CIE_a*request, CIE_b*request, CIE_L*request$^2$, CIE_a*request$^2$, CIE_b*request$^2$, CIE_L*request×CIE_a*request, CIE_a*request×CIE_b*request, CIE_b*request×CIE_L*request, and 1}. Where CIE_L*request is the L* component of the CIE_Lab request 20, CIE_a*request is the a* component, and CIE_b*request is the b* component. Then the colorant levels are in the color estimate matrix, Yest 100, equal to the Xnew matrix 90 multiplied by the B matrix 80. Yest 100 will contain {colorant level for color 1, colorant level for color 2, and colorant level for color 3}. If the colorant level is less than the level that will tint the paper then remove the colorant from the recipe.

Given the colorant levels for a CIE_Lab color request, it is nice to know how accurate the printed color will be. To estimate the accuracy, first determine if the color is in the database modeled, then estimate how accurate the model is. Lastly estimate how the accuracy of the printing system will impact the accuracy of the written color.

Figure 2:
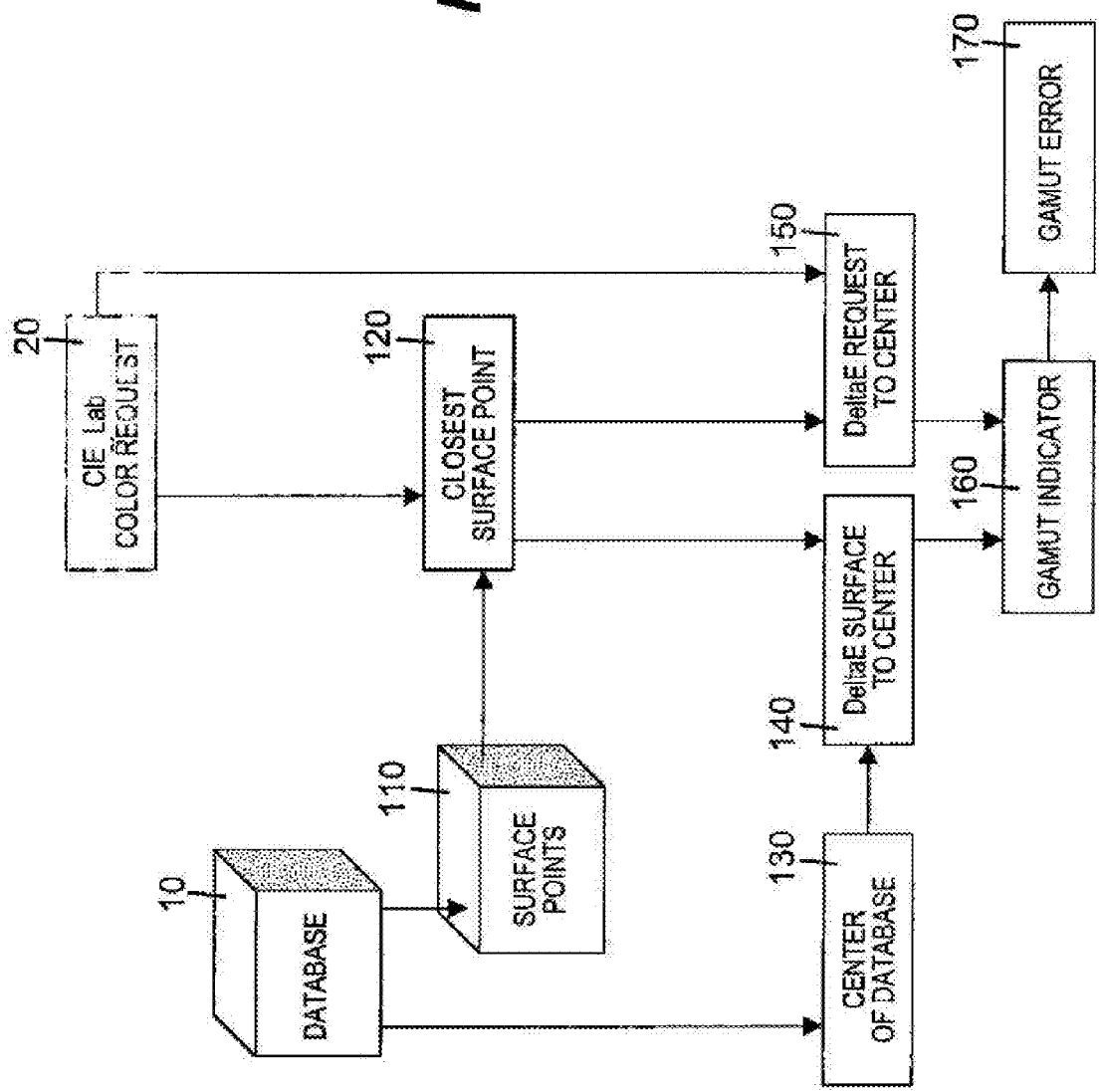
FIG. 2 is a block diagram describing how to calculate the gamut indicator for a given three color database.

Referring now to FIGS. 1 and 2, if the color is not included in the original database, then it is assumed that the color is out of gamut for this set of colorants, and there must be an increase of the error estimate by an amount that indicates how far out of gamut the CIE_Lab request 20 is. To compute this gamut error estimate the surface points 110 in the database 10 is first found. For each entry in the database 10, for each colorant in each entry, if the index of the colorant is equal to 1 or the maximum index for that colorant, then that entry is a surface point and included in the surface points subset 110.

For each point in the surface point subset 110 compute the Delta E to Request as the Delta E between the entry and the CIE_Lab request 20. Define the CIE_Lab of the closest surface point 120 as being that entry with the minimum Delta E to request. Again time is saved by computing DeltaE$^2$ for each surface point and selecting the closest surface point as that point that has the smallest DeltaE$^2$.

Next, the center of the database 130 is found by finding the minimum and maximum CIE_L*, CIE_a*, and CIE_b* values in the database 10. The CIE_L* Center point is calculated using CIE_L* Center=(max(CIE_L*)−min(CIE_L*))/2+min(CIE_L*)=(max(CIE_L*)+min(CIE_L*))/2. Similarly CIE_a*Center=(max(CIE_a*)−min(CIE_a*))/2+min (CIE_a*)=(max(CIE_a*)+min(CIE_a*))/2 and CIE_b*Center=(max(CIE_b*)−min(CIE_b*))/2+min (CIE_b*)=(max(CIE_b*)+min(CIE_b*))/2.

Next, the distance between the CIE_Lab request 20 and the CIE_Lab center 140, DeltaERequestToCenter 150=square root ((CIE_L*Request−CIE_L*Center)$^2$+(CIE_a*Request−CIE_a*Center)$^2$+(CIE_b*Request−CIE_b*Center)$^2$) is computed. Then the distance between the CIE_Lab surface 120 and the CIE_Lab center 140, DeltaESurfaceToCenter=square root ((CIE_L*Surface−CIE_L*Center)$^2$+(CIE_a*Surface−CIE_a*Center)$^2$+(CIE_b*Surface−CIE_b*Center)$^2$) is computed. Now the Gamut Indicator 160=DeltaERequestToCenter 150−DeltaESurfaceToCenter may be computed. If the gamut indicator 160 is less than zero then the CIE_Lab request 20 is inside the database 10 and the gamut error 170 is set to zero. Otherwise the gamut error 170 is set to the gamut indicator 160 which is the estimated distance that the CIE_Lab request 20 is outside the database 10.

Figure 3:
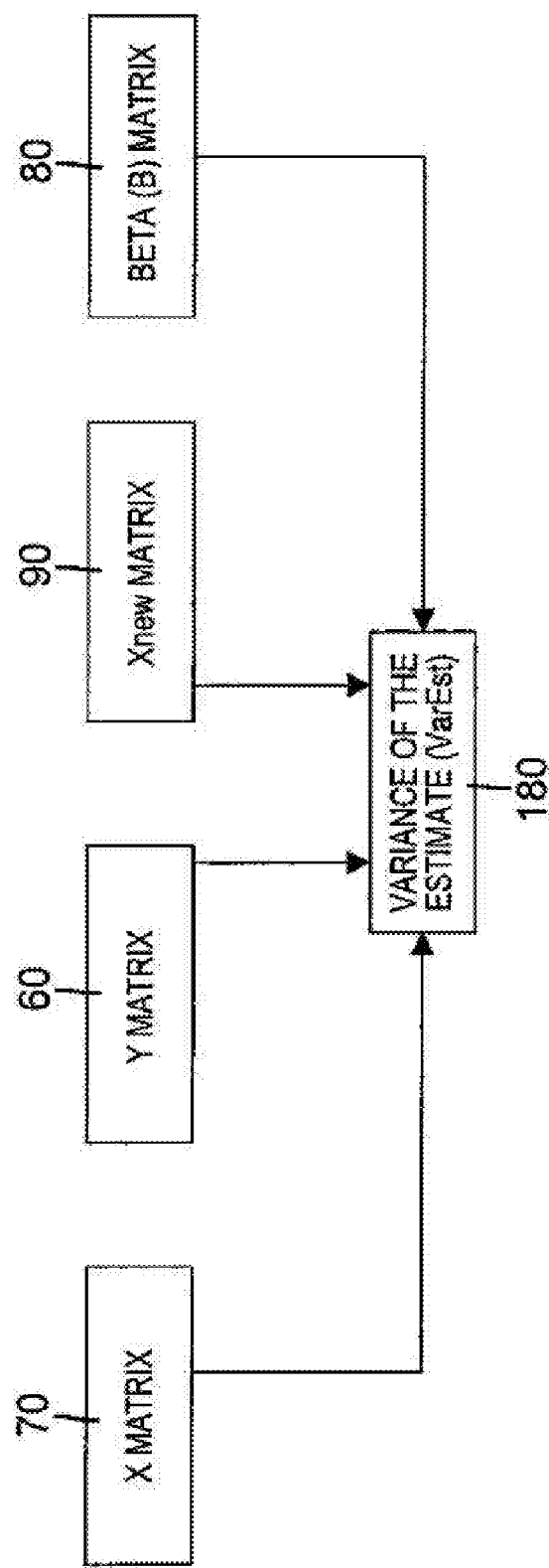
FIG. 3 is a block diagram showing calculation steps to determine the variance of the recipe estimate.

Referring to FIG. 3, the next component of the error is the error due to modeling. This error is obtained by computing the variance of the estimate for the model as defined by Draper and Smith. The variance of the estimate (VarEst) 180 may be computed using VarEst 180=Xnew (X' inv(X)) Xnew' MSE$^2$, where Xnew 90 is the X matrix composed of the CIE_Lab request 20, Xrequest' is the transpose of Xrequest, X is the X matrix 70 of input colorant settings, inv(X) is the inverse of the X matrix 70, and MSE$^2$ is the variance of the mean squared error.

Note that Xnew (X' inv(X)) Xnew' will be a 1×1 solution. MSE$^2$ will be a 3×3 matrix. The term on the diagonal corresponds to the variance of the modeled colorants. VarEst 180=Xnew (X' inv(X)) Xnew' {MSE$^2$(1,1), MSE$^2$(2,2), MSE$^2$(3,3)}.

Compute MSE$^2$ using MSE$^2$=(Y'Y−B'X'Y)/dFResidual where the a Y matrix 60 consists of the measured output colorant settings from the subset of data points, Y' is the transpose of the Y matrix 60, B is the Beta matrix 80, B' is the transpose of the Beta matrix 80, and dFResidual is the degrees of freedom in the residual computed as the total degrees of freedom used to compute the Beta matrix 80 minus the degrees of freedom used in the model. For example there are 27 entries giving 27 total degrees of freedom. 10 model terms are estimated, so 10 degrees of freedom are used to build the model giving 17 degrees of freedom in the residuals. (dFResidual=17).

The model produces colorant levels from CIE_Lab request 20. So the variance of the estimate 180 is in terms of colorant levels. The invention converts this variability in colorant levels into terms of CIE_Lab color or Delta E. To do this CIE_Lab is modeled as a function of colorant levels. Note that the current model produces a Beta matrix 80 that models colorant levels as a function of CIE_Lab. The conversion will use a second Beta Matrix to model CIE_Lab as a function of colorant levels. To make this new model the same subset of data points 50 centered about the center points to be modeled 40 is used.

First, a Y2 matrix 200 is created of measured color from the subset of data points 50. The output values from this second model will be CIE_Lab estimate for a given set of colorant settings. The Y2 matrix 200 will have one column of 27 CIE_L* values, one column of 27 CIE_a* values, and one column of 27 CIE_b* values making it a 27 by 3 matrix.

Figure 4:
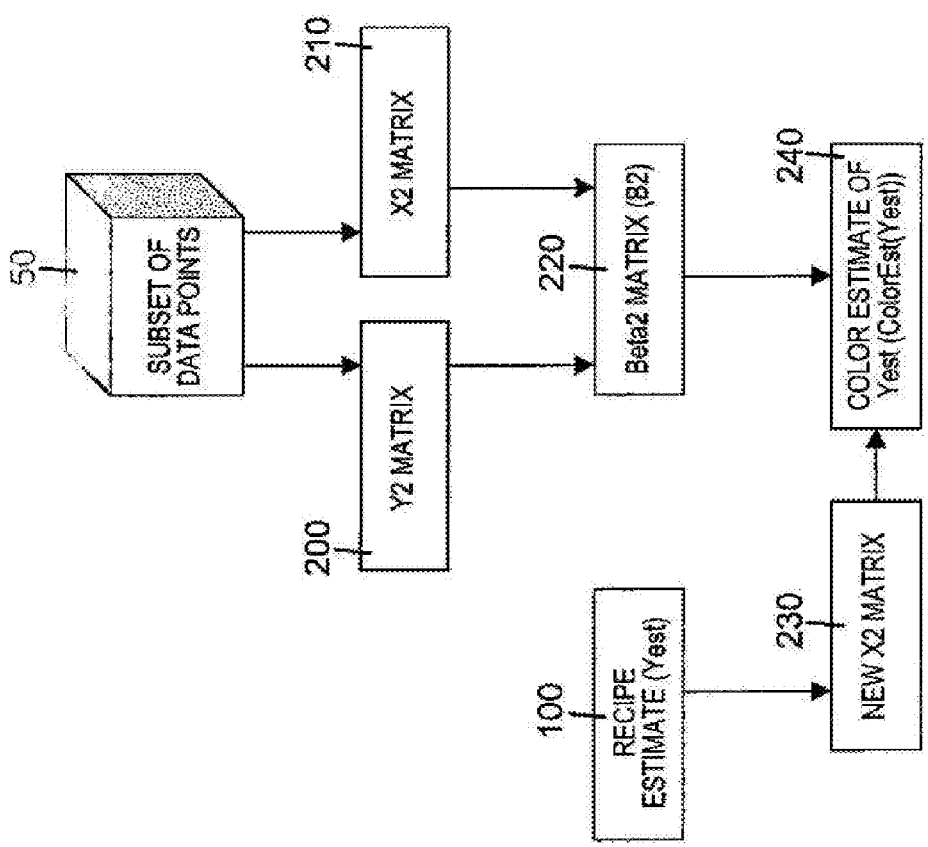
FIG. 4 is a block diagram showing the estimated color of the recipe estimate.

Referring to FIG. 4, an X2 matrix 210 is created of colorant settings from our subset of data points 50. The X2 matrix 210 contains one column for each factor used in the second model. The output color as a function of colorant1, colorant2, and colorant3 will be modeled. This description will also add columns to the X2 matrix 210 for colorant1$^2$, colorant2$^2$, colorant3$^2$, colorant1×colorant2, colorant2×colorant3, colorant3×colorant1, and a column of ones. This creates an X2 matrix 210 that is 27 rows by 10 columns. Each row corresponds to an entry for one of the 27 rows of the subset of data points 50 centered about the points to be modeled. The modeling process will create slopes for each factor.

Next, the Beta matrix (B2 matrix) 220=(X2' inv(X2)) X2' Y2 where X2 is the X2 matrix 210, X2' is the transpose of the X2 matrix 210, inv(X2) is the inverse of the X2 matrix 210, and Y2 is the Y2 matrix 200 is computed. The B2 matrix 220 will be 10 by 3.

The Beta matrix (B2 matrix) 220 is used to estimate a Y2est by multiplying a new X2new by B2. (Y2est=X2new B2) where X2new is a 1 by 10 matrix composed of {colorant1, colorant2, colorant3, colorant1$^2$, colorant2$^2$, colorant3$^2$, colorant1×colorant2, colorant2×colorant3, colorant3×colorant1, and 1}. Y2est will be a 1 by 3 matrix consisting of {CIE_L*Estimate, CIE_a*Estimate, and CIE_b*Estimate}.

The second model is used to estimate the error in color due to the first model error. The recipe estimate Yest 100={C1, C2, and C3} is from the first model given a CIE_Lab request 20. Given Yest 100 compose a new X2 matrix 230 X2(Yest)={C1, C2, C3, C1$^2$, C2$^2$, C3$^2$, C1×C2, C2×C3, C3×C1, 1}. Compute the estimated color for the estimated colorant levels ColorEst(Yest) 240=X2(Yest) B2.

Next, the color for a least significant digit change in each of the colorant levels taken one at a time is computed. Then the difference in color for each colorant level taken one at a time is computed. Lastly variance components for each colorant difference to generate a color error is added up.

Figure 5:
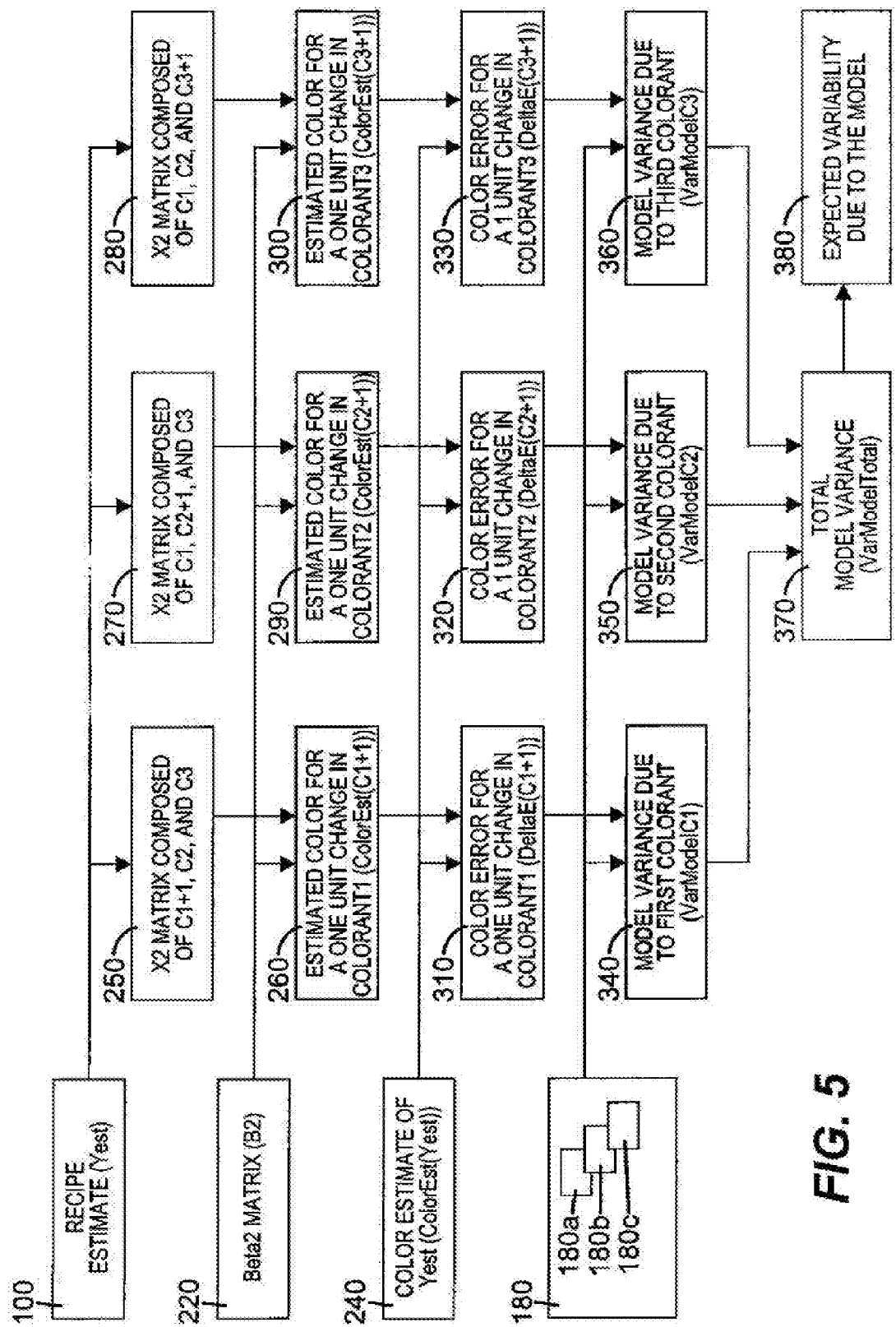
FIG. 5 is a block diagram showing the calculation of the model variance.

Referring to FIG. 5, the estimated color for a one unit change in colorant1 260 is ColorEst(C1+1)=X2(C1+1, C2, C3) B2. Where X2(C1+1, C2, C3) 250 is an X2 matrix composed of colorant1 setting of C1+1, colorant 2 setting of C2, colorant3 setting of C3, and levels {C1, C2, C3} are from Yest 100. B2 is the Beta2 matrix 220. The color error for a one unit change in colorant1 310 is DeltaE(C1+1)=sqrt{[CIE_L*(ColorEst(C1+_1))−CIE_L*(ColorEst(Yest)]$^2$+[CIE_a*(ColorEst(C1+_1))−CIE_a*(ColorEst(Yest)]$^2$+[CIE_b*(ColorEst(C1+_1))−CIE_b*(ColorEst(Yest)]$^2$}.

The estimated color for a one unit change in colorant2 290 is ColorEst(C2+1)=X2(C1, C2+1, C3) B2. Where X2(C1, C2+1, C3) 270 is an X2 Matrix composed of colorant1 setting of C1, colorant2 setting of C2+1, colorant3 setting of C3, and levels {C1, C2, C3} are from Yest 100. B2 is the Beta2 matrix 220. The color error for a one unit change in colorant 2 is DeltaE(C2+1)=sqrt{[CIE_L*(ColorEst(C2+_1))−CIE_L*(ColorEst(Yest)]$^2$+[CIE_a*(ColorEst(C2+_1))−CIE_a*(ColorEst(Yest)]$^2$+[CIE_b*(ColorEst(C2+_1))−CIE_b*(ColorEst(Yest)]$^2$}.

The estimated color for a one unit change in colorant3 300 is ColorEst(C3+1)=X2(C1, C2, C3+1) B2. Where X2(C1, C2, C3+1) 280 is an X2 matrix composed of colorant1 setting of C1, colorant2 setting of C2, colorant3 setting of C3+1, and levels {C1, C2, C3} are from Yest 100. B2 is the Beta2 matrix 220. The color error for a one unit change in colorant3 is DeltaE(C3+1)=sqrt{[CIE_L*(ColorEst(C3+_1))−CIE_L*(ColorEst(Yest)]$^2$+[CIE_a*(ColorEst(C3+_1))−CIE_a*(ColorEst(Yest)]$^2$+[CIE_b*(ColorEst(C3+_1))−CIE_b*(ColorEst(Yest)]$^2$}.

Finally, the error in color due to the model may be computed. First, the model variances are computed. The model variance due to the first colorant, VarModelC1 340=VarEst(1) 180$a$×DeltaE(C1+1)$^2$ 310. The model variance due to the second colorant, VarModelC2 350=VarEst(2) 180$b$×DeltaE (C2+1)$^2$ 320. The model variance due to the third colorant, VarModelC3 360=VarEst(3) 180$c$×DeltaE (C3+1)$^2$ 330. The total model variance=the sum of the variances=VarModelTotal 370=VarModelC1 340+VarModelC2 350+VarModelC3 360. The expected variability due to the model 380 in terms of Delta E is the square root of VarModelTotal 370.

Figure 6:
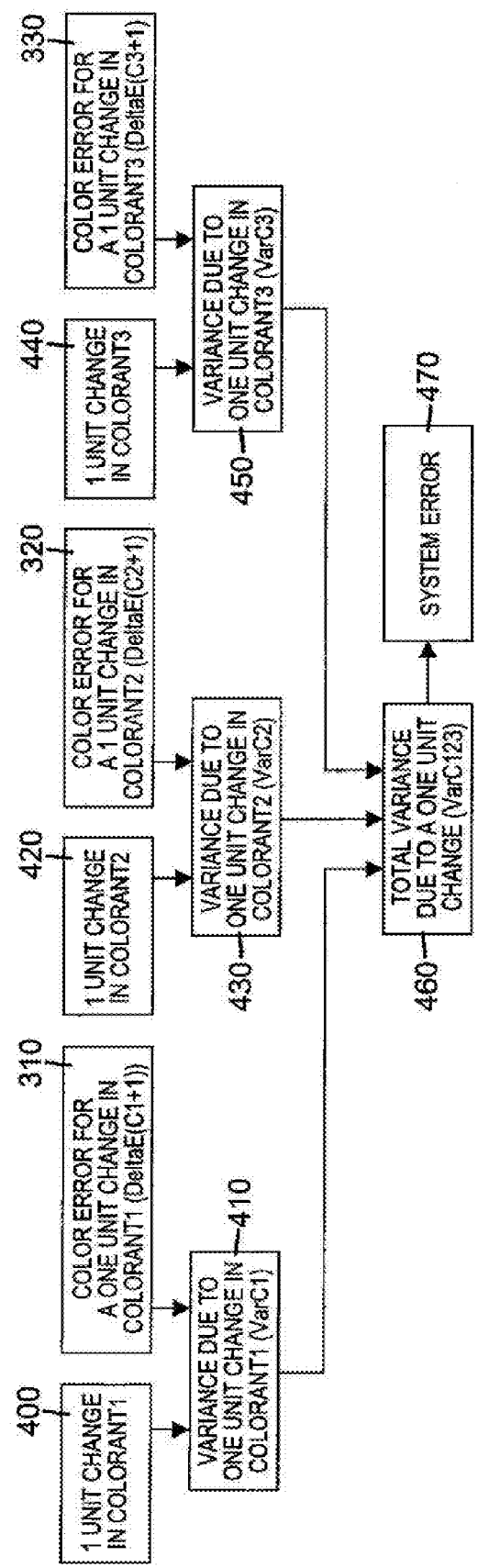
FIG. 6 is a block diagram showing the calculation of the variance for a one unit change in each colorant.

Referring to FIG. 6, the variability due to a one unit change in each of the colorants may also be computed. The variance due to a one unit change in the first colorant is VarC1 410=(1 unit change)$^2$ 400×DeltaE(C1+1)$^2$ 310. The variance due to a one unit change in the second colorant is VarC2 430=(1 unit change)$^2$ 420×DeltaE(C2+1)$^2$ 320. The variance due to a one unit change in the third colorant is VarC3 450=(1 unit change)$^2$ 440×DeltaE(C3+1)$^2$ 450. The total variance due to a one unit change is VarC123 460=VarC1 410+VarC2 430+VarC3 450. The expected variability due to a one unit change in each colorant level is the system error 470, assuming that the system is accurate to ±1 unit in each color. This system error 470 is equal to the square root of VarC123 in terms of Delta E.

This estimate may be modified for systems that are better or worse at holding output density to within one unit per colorant. Also note that this estimate may be modified based on the colorant settings if it is found that the accuracy of the printing system depended upon the colorant settings.

Figure 7:
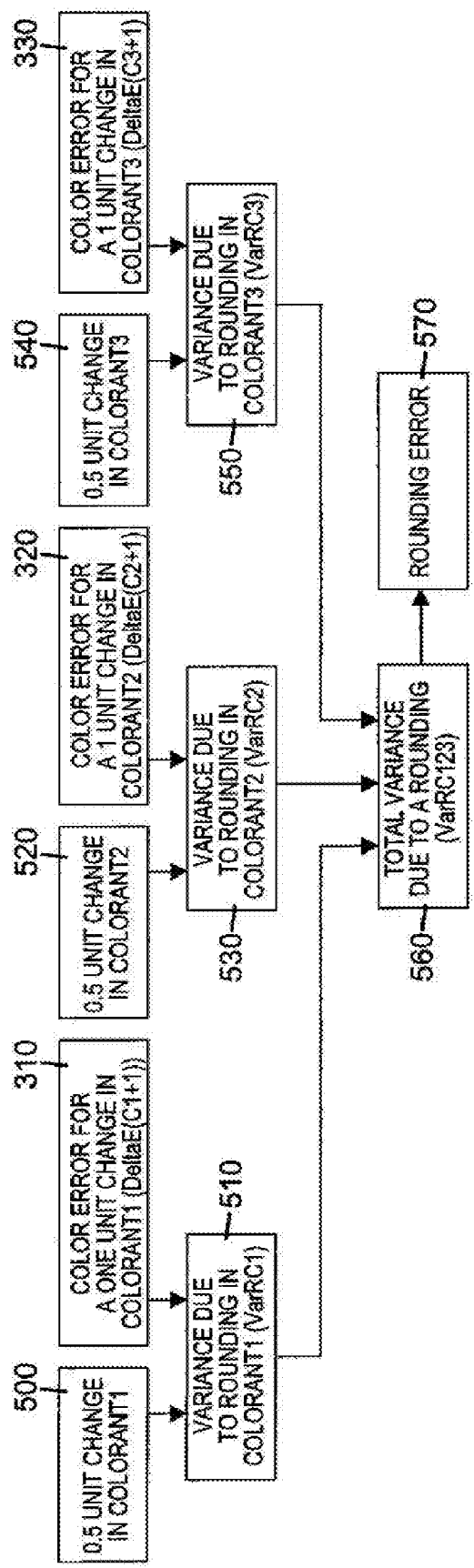
FIG. 7 is a block diagram showing the calculation of the variance for rounding each colorant to an integer colorant level.

Referring to FIG. 7, an error due to rounding the colorant settings to the nearest unit may also be computed. The variance due to rounding in the first colorant is VarRC1 510=(0.5 unit change)$^2$ 500×DeltaE(C1+1)$^2$ 310. The variance due to rounding in the second colorant is VarRC2 530=(0.5 unit change)$^2$ 520×DeltaE(C2+1)$^2$ 320. The variance due to rounding in the third colorant is VarRC3 550=(0.5 unit change)$^2$ 540×DeltaE(C3+1)$^2$ 330. The total variance due to rounding is VarRC123 560=VarRC1 510+VarRC2 530+VarRC3 550. The expected variability due to rounding each colorant level is the rounding error 570. This rounding error 570 is equal to the square root of VarRC123 560 in terms of Delta E.

Figure 8:
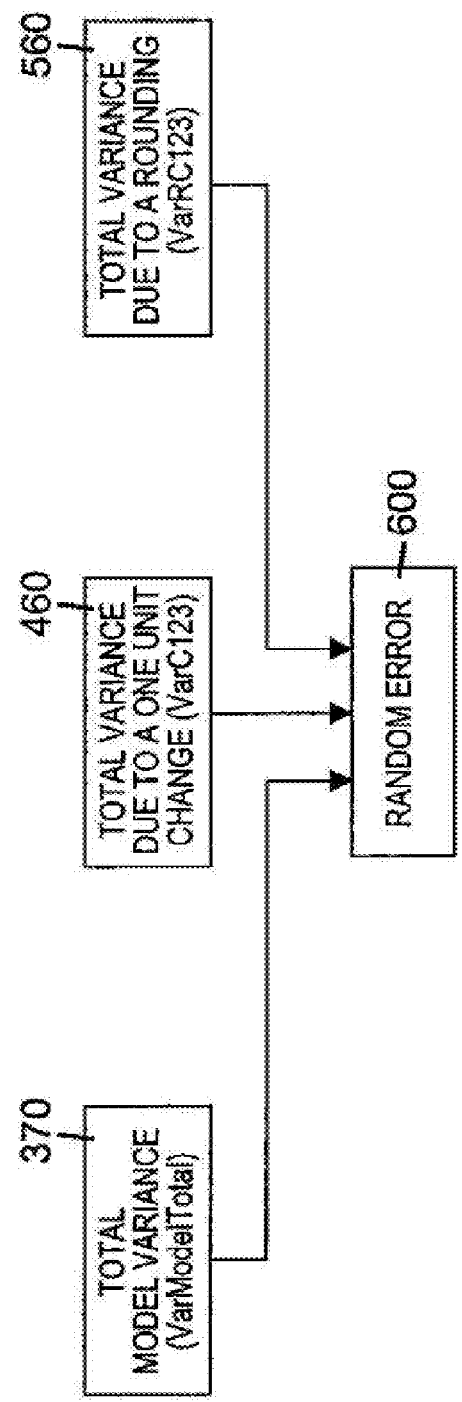
FIG. 8 is a block diagram showing the calculation of the random error from the variance components.

Referring to FIG. 8, for this database a total accuracy equal to the gamut error 170 plus or minus the errors due to the model 380, errors due to the system 470, and errors due to rounding 570 may now be computed. The model, system, and rounding errors may be considered random and noncorrelated relative to each other. Therefore, the total error may be estimated by using the square root of the sum of their variances. The gamut error is in addition to the random errors, as the CIE_Lab request is outside the gamut of the database and there is no means to achieve the desired color. The random errors will be centered about the gamut error. If the CIE_Lab request is within the database the gamut error will be zero. The accuracy of the output color is computed as the gamut error±random error 600 where the random error 600=the square root of the sum of (VarModelTotal 370+VarC123 460+VarRC123 560).

In this example a database consisting of black, cyan, and magenta colorants is disclosed. A CIE_Request 20 substantially in the red area of CIE_Lab colorspace will have a gamut error greater than zero indicating that the requested color is out of the blue database. Another database may be generated using the colorants black, magenta, and yellow. A Kodak Approval Digital Color Proofing System to image Magenta DM02, Yellow DY01, and Black DK02 donors was used. Nine magenta density clicks from D-52 in steps of 10, nine Yellow density clicks from D-59 in steps of 11, and eight black density clicks of {−61, −52, −42, −32, −20, −8, 6, and 30} is used. On the Kodak Approval Digital Color Proofing System a Yellow DY01 density click is converted to Status T Density by the formula Density Click*0.0125+0.73+Yellow Density of Paper. The color patches were read using a Gretagmacbeth Spectroscan/Spectrolino. This second database was processed using the same method as the first database to create a black, magenta, and yellow colorant settings for a given CIE_Lab request. The accuracy for the second database was also calculated using the same method as the first database to create a gamut error±random error to define the accuracy of this second colorant settings set.

Databases were created using the donor sets; {Black DK02, Cyan DC02, and Yellow DY01}, {Cyan DC02, Magenta DM02, Yellow DY01}, {Black DK02, Magenta DM02, Orange DO01}, {Black DK02, Yellow DY01, Orange DO01}, {Black DK02, Yellow DY01, Green DG01}, {Black DK02, Cyan DC02, Green DG01}, {Black DK02, Cyan DC02, Blue DB01}, {Black DK02, Magenta DM02, Blue DB01}, and {Cyan DC02, Magenta DM02, Blue DB01}.

Figure 9:
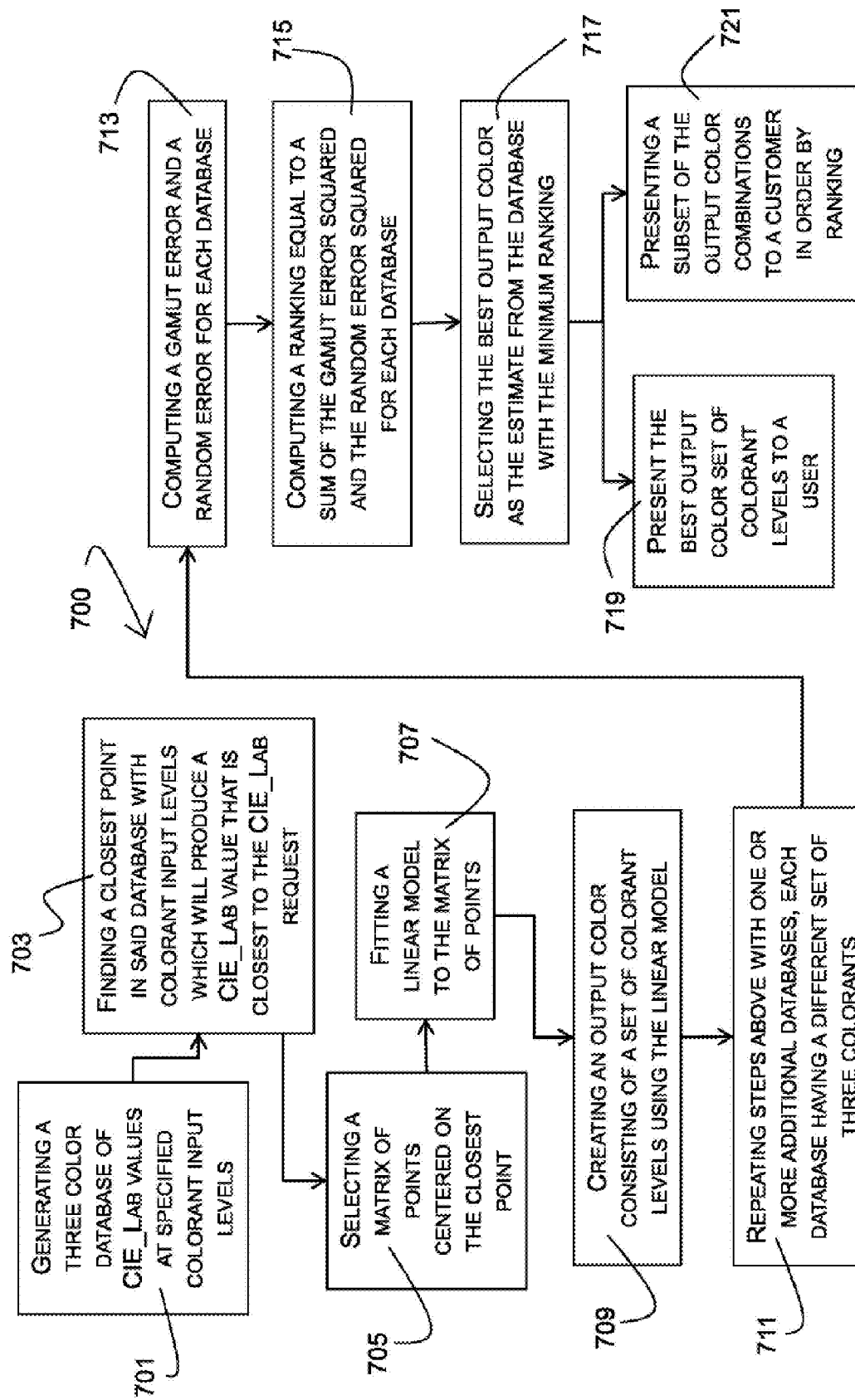
FIG. 9 is a flowchart showing the progression of method steps leading to a calculation for a variance of estimated output color and ranking and presenting the colorant levels to a user.

FIG. 9 shows for each database, given a CIE_Lab request, the gamut error (170a-170c) and random error (600a-600c) is calculated. The output recipes (100a-100c) were sorted using the sum of the gamut error$^2$ and the random error$^2$ from lowest to highest. The three best solutions (610a-610c) with the lowest rankings were presented (620) as options to the customer (630).

In this example equally spaced increments of the cyan and magenta colorant input levels were used. It is understood that the use of nonlinear increments as shown in black may also be chosen. Or linear increments in all three colorants may be used.

In the example, an 8×9×9 array of black, cyan, and magenta, with data from paper to the maximum density settings of the printer was used. It is understood that it can be chosen to model data only near neutrals, or some other color target such as process red on a printing press.

In the present invention different colorants from different sets such as Kodak Approval Cyan DC03, Cyan DC04, Cyan DC05, Magenta DM01, Magenta DM03, Magenta DM04, Yellow DY02, Yellow DY03, Yellow DY04, and Black DK03 may be imaged. One colorant set may be compared to another by ranking the resulting output colorants according to the sum of gamut error$^2$ and random error$^2$.

While the example disclosed used databases imaged on a Kodak Approval Digital Proofing System, it is understood that recipes may be created with the invention for other colorant systems. For instance a database may be created using different concentrations of three colors of ink to model an inkjet printing system.

A database may be created using a binary proofing system using three colorants screened with a halftone screen at a halftone screen rulings and angles with different percent tint levels. Or a database may be created using a binary proofing system with three colorants screened using a stochastic screen at different percent tint levels. The invention may be used to model solid colors, screened colors, or colors composed using any type of modulation pattern.

A database may be created using paint with colorants composed of different levels of three primary pigments.

In all of the cases sited the invention may be used to select the best recipe from different sets of colorants or, different types of primary colorants. The invention may also be used to select recipes from sets of primary colorants that are substantially the same color yet different from each other.

Referring to FIG. 9, a method for selecting a best three color solution for a CIE_Lab request 700 is displayed by the steps of generating a three color database of CIE_Lab values at specified colorant input levels 701; finding a closest point in said database with colorant input levels which will produce a CIE_Lab value that is closest to the CIE_Lab request 703; selecting a matrix of points centered on the closest point 705; fitting a linear model to the matrix of point 707; and creating an output color consisting of a set of colorant levels using the linear model 709; repeating the steps above with one or more additional databases, each database is a different set of three colorants 711; computing a gamut error and a random error for each database 713; computing a ranking equal to a sum of the gamut error squared and the random error squared for each database 715; selecting the best output color as the estimate from the database with the minimum ranking 717; and alternatively selecting either to present the best output color set of colorant levels to a user 719; and/or presenting a subset of the output color combinations to a customer in order by ranking 721.

The invention has been described in detail with particular reference to certain preferred embodiments thereof, but it will be understood that variations and modifications can be effected within the scope of the invention.

PARTS LIST 10 database
20 CIE_Lab color request
30 closest data point
40 center of points to be modeled
50 subset of data points
60 Y matrix
70 X matrix
80 Beta (B) matrix
90 Xnew matrix
100 recipe estimate (Yest)
110 surface points
120 closest surface point
130 center of database
140 DeltaE Surface to Center
150 DeltaE Request to Center
160 gamut indicator
170 gamut error
180 variance of the estimate (VarEst)
200 Y2 matrix
210 X2 matrix
220 Beta2 matrix (B2)
230 new X2 matrix
240 color estimate of Yest (ColorEst(Yest))
250 X2 matrix composed of C1+1, C2, and C3
260 estimated color for a one unit change in colorant1 (ColorEst(C1+1))
270 X2 matrix composed of C1, C2+1, and C3
280 X2 matrix composed of C1, C2, and C3+1
290 estimated color for a one unit change in colorant2 (ColorEst(C2+1))
300 estimated color for a one unit change in colorant3 (ColorEst(C3+1))
310 color error for a 1 unit change in colorant1 (DeltaE(C1+1)
320 color error for a 1 unit change in colorant2 (DeltaE(C2+1)
330 color error for a 1 unit change in colorant3 (DeltaE(C3+1)
340 model variance due to first colorant (VarModelC1)
350 model variance due to second colorant (VarModelC2)
360 model variance due to third colorant (VarModelC3)
370 total model variance (VarModelTotal)
380 expected variability due to the model
400 1 unit change in colorant 1
410 variance due to one unit change in colorant1 (VarC1)

420 1 unit change in colorant2
430 variance due to one unit change in colorant2 (VarC2)
440 1 unit change in colorant3
450 variance due to one unit change in colorant3 (VarC3)
460 total variance due to a one unit change (VarC123)
470 system error
500 0.5 unit change in colorant1
510 variance due to rounding in colorant1 (VarRC1)
520 0.5 unit change in colorant2
530 variance due to rounding in colorant2 (VarRC2)
540 0.5 unit change in colorant3
550 variance due to rounding in colorant3 (VarRC3)
560 total variance due to a rounding (VarRC123)
570 rounding error
600 random error
700 method for selecting a best three color solution for a CIE_Lab request
701 step 1 of method 700
703 step 2 of method 700
705 step 3 of method 700
707 step 4 of method 700
709 step 5 of method 700
711 step 6 of method 700
713 step 7 of method 700
715 step 8 of method 700
717 step 9 of method 700
719 step 10 of method 700
721 step 11 of method 700

The invention claimed is:

1. A method for selecting a best three color solution for a Commission Internationale de l'Éclairage L*a*b* (CIE_Lab) request comprising:
    generating a three color database of CIE_Lab values at specified colorant input levels in a color proofer system;
    finding a closest point in said database with colorant input levels which will produce a CIE_Lab value that is closest to the CIE_Lab request;
    selecting a matrix of points centered on the closest point;
    fitting a linear model to the matrix of points;
    creating an output color consisting of a set of colorant levels using the linear model;
    forming a surface subset of the database comprising all points that have a minimum or a maximum colorant input level for one or more of the input colorants;
    computing a difference of measured CIE_Lab values for each point in the surface subset to the CIE_Lab request;
    selecting a closest surface point as a surface point with the minimum CIE_Lab difference;
    computing a CIE_Lab center of the database;
    computing a first distance between the CIE_Lab request and the CIE_Lab center;
    computing a second distance between the CIE_Lab for the closest surface point and the CIE_Lab center; and
    computing a gamut indicator as the second distance minus the first distance;
    calculating a variance of an estimated output color using at least the gamut indicator.

2. A method as in claim 1 wherein the closest point is identified by comparing sum of squares of differences of CIE_L*, CIE_a*, and CIE_b* between the CIE_Lab request and the database CIE_Lab values.

3. A method as in claim 1 comprising the additional step of:
    using the variance of the estimated output color to determine an accuracy of the output color.

4. A method as in claim 1 wherein the matrix of points centered on the closest point is a 3×3×3 array.

5. A method as in claim 1 wherein if the closest point is on a surface of the database, select the matrix of points as being a 3×3×3 array of points in the database closest to the CIE_Lab request.

6. A method as in claim 1 comprising the additional step of:
    computing a gamut error equal to the gamut indicator if the gamut indicator is greater than zero, or zero if the gamut indicator is less than zero.

7. A method as in claim 6 wherein a total error for the database is the sum of the gamut error plus a variance of the estimated output color.

8. A method as in claim 1 comprising the additional steps of:
    repeating the steps in claim 1 with one or more additional databases, wherein each additional database is a different set of three colorants.

9. The method of claim 8 wherein the additional databases consist of the three color combinations selected from a group comprising {CMK, MYK, CYK, CMY, MOK, YOK, YGK, CGK, CBK, MBK, MYG, or CYG}.

10. The method of claim 8 comprising the additional steps of:
    computing a gamut error and a random error for each database; and
    computing the ranking equal to a sum of the gamut error squared and the random error squared for each database.

11. The method of claim 10 comprising the additional steps of:
    selecting the best output color as the estimate from the database with the minimum ranking; and
    present the best output color set of colorant levels to a user.

12. The method of claim 10 comprising the additional step of:
    presenting a subset of the output color combinations to a customer in order by ranking.

13. A method as in claim 8 wherein each additional database uses different specified colorant input levels on one or more colorants.

14. The method of claim 1 wherein the set of specified colorant input levels on one or more colorants are not equally spaced.

15. The method of claim 1 wherein each colorant level in the output set of colorant levels is eliminated, if the colorant level is less than a threshold that would tint the paper.

16. The method of claim 1 with the additional step of:
    repeating the steps in claim 1 with an additional database wherein the additional database is composed of the same color colorants, however at least one of the colorants used is different.

17. A method as in claim 1 wherein the variance of an estimated output color includes one or more errors due to a model, errors due to a system, or errors due to rounding.

18. A method for selecting a best three-color solution for a Commission Internationale de l'Éclairage L*a*b* (CIE_Lab) request comprising:
    generating a first three color database of CIE_Lab values at specified colorant input levels for a first set of three colorants in a color proofer system;
    finding a first closest point in said first three color database with colorant input levels which will produce a CIE_Lab value that is closest to the CIE_Lab request;
    selecting a first matrix of points centered about said first closest point;
    fitting a first linear model to said first matrix;
    creating a first output color consisting of a first set of colorant levels using the first linear model;
    computing a first random error and a first gamut error;

generating a second three color database of CIE_Lab values at specified colorant input levels for a second set of three colorants;

finding a second closest point in said second three color database with colorant input levels which will produce a CIE_Lab value that is closest to the CIE_Lab request;

selecting a second matrix of points centered around said second closest point;

fitting a second linear model to the second matrix of points;

creating a second output color consisting of a second set of colorant levels using the second linear model;

computing a second random error and a second gamut error;

ranking the first output color and the second output color using the first random error, first gamut error, second random error, and second gamut error;

sorting said first and second output colors by rank; and presenting sorted output colors and the ranking of the first and second output colors based on a calculation using the random errors and gamut errors to a user.

19. The method of claim 18 comprising the additional step of:

presenting an output color with the lowest ranking to a customer.

20. The method of claim 18 comprising the additional steps of;

generating one or more additional three color databases of CIE_Lab values at specified colorant input levels for a one or more additional sets of three colorants;

for each additional database:

finding a closest point in the database with colorant input levels which will produce a CIE_Lab value that is closest to the CIE_Lab request;

selecting a matrix of points centered about said closest point;

fitting a linear model to said matrix;

creating an output color consisting of a set of colorant levels using the linear model;

computing a random error and a gamut error for each output color;

ranking each output color using its random error and gamut error; and sorting the output color combinations by their rank.

21. The method of claim 20 comprising the additional step of only presenting the output color with the lowest rank.

22. The method of claim 20 comprising the additional step of only presenting a subset of the output colors sorted by rank.

23. A method for selecting a best three color solution for a Commission Internationale de l'Éclairage L*a*b* (CIE_Lab) request comprising:

generating a first three color database of CIE_Lab values at specified colorant input levels for a first set of three colorants in a color proofer system;

finding a first closest point in said first three color database with colorant input levels which will produce a CIE_Lab value that is closest to the CIE_Lab request;

selecting a first matrix of points centered about said first closest point;

fitting a linear model to said first matrix;

creating a first output color consisting of a first set of colorant levels using the first linear model;

computing a first random error and a first gamut error;

generating a second three color database of CIE_Lab values at specified colorant input levels for a second set of three colorants in a color proofer system;

finding a second closest point in said second three color database with colorant input levels which will produce a CIE_Lab value that is closest to the CIE_Lab request;

selecting a matrix of points centered about said second closest point;

fitting a second linear model to said second matrix of points;

creating a second output color consisting of a second set of colorant levels using the second linear model;

computing a second random error and a second gamut error;

ranking the first output color and the second output color using the first random error, first gamut error, second random error, and second gamut error;

sorting said first and second output colors by rank; and presenting the output color with the highest rank.

* * * * *

UNITED STATES PATENT AND TRADEMARK OFFICE
CERTIFICATE OF CORRECTION

| | | |
|---|---|---|
| PATENT NO. | : 7,656,567 B2 | Page 1 of 1 |
| APPLICATION NO. | : 11/035306 | |
| DATED | : February 2, 2010 | |
| INVENTOR(S) | : Kurt M. Sanger | |

It is certified that error appears in the above-identified patent and that said Letters Patent is hereby corrected as shown below:

Column 12, claim 9, line 20   Please replace the text "CGK, CBK, MBK, CMB, MYG, or CYG}." with the following corrected text -- CGK, CBK, MBK, CMB, MYO, or CYG}. --

Signed and Sealed this

Sixth Day of July, 2010

David J. Kappos
*Director of the United States Patent and Trademark Office*